(12) United States Patent
Lin

(10) Patent No.: US 6,374,015 B1
(45) Date of Patent: Apr. 16, 2002

(54) TEMPERATURE-COMPENSATING DEVICE WITH TUNABLE MECHANISM FOR OPTICAL FIBER GRATINGS

(75) Inventor: I-En Lin, Mounli (TW)

(73) Assignee: Rich Key Technologies Limited, Mounli (TW)

( * ) Notice: Subject to any disclaimer, the term of this patent is extended or adjusted under 35 U.S.C. 154(b) by 78 days.

(21) Appl. No.: 09/630,281

(22) Filed: Aug. 1, 2000

(51) Int. Cl.⁷ .................................................. G02B 6/34
(52) U.S. Cl. ........................................................ 385/37
(58) Field of Search ............................. 385/37, 136, 72

(56) References Cited

U.S. PATENT DOCUMENTS

| | | | | |
|---|---|---|---|---|
| 4,725,110 A | * | 2/1988 | Glenn et al. ................. | 385/100 |
| 5,042,898 A | * | 8/1991 | Morey .......................... | 385/37 |
| 5,469,520 A | * | 11/1995 | Morey .......................... | 385/37 |
| 6,295,399 B1 | * | 9/2001 | Engelberth ................... | 385/37 |
| 6,327,405 B1 | * | 12/2001 | Leyva .......................... | 385/37 |

* cited by examiner

Primary Examiner—Neil Abrams

(74) Attorney, Agent, or Firm—Intellectual Property Solutions, PLLC

(57) ABSTRACT

A temperature-compensating device with tunable mechanism for optical fiber gratings includes a moving pin, a tube housing, a rotation sleeve, a plug and a locking screw. The moving pin has a first predetermined outer screw pitch at one end and an elongated slot at the other end for receiving the locking screw. The tube housing has a second predetermined outer screw pitch at one end and an inner screw pitch at the other end. The rotation sleeve has a first predetermined inner thread corresponding to the first predetermined outer screw pitch of the moving pin, and a second predetermined inner thread corresponding to the second predetermined outer screw pitch of the tube housing. The plug is inserted into the end of the tube housing with outer thread engaged with the inner screw pitch of the tube housing. The grating fiber is placed inside the moving pin. The slot of the moving pin is guided by the locking screw which enables the linear movement of the moving pin. When the locking screw is in position, the moving pin cannot self-rotate, so rotating the sleeve in one cycle will make the moving pin have a movement of the second predetermined outer screw pitch minus the first predetermined outer screw pitch. Once the locking screw is rotated outwardly not to guide the slot, rotating the rotation sleeve 360 degrees will result in the second predetermined outer screw pitch movement of the moving pin, which called "quick movement".

8 Claims, 7 Drawing Sheets

|  | Kovar | Grating fiber | SUS304 | Aluminum |
|---|---|---|---|---|
| Thermal expansion coefficient (m/m°C) | 1.2E-6 | 5.5E-7 | 1.05E-5 | 2.5E-5 |
| Young's Modulus, E (N/m$^2$) | 1.38E11 | 0.92E10 | 2.0E11 | 7.0E10 |
| Type 1 |  |  |  |  |
| Cross Area, A m$^2$ | 1.2566E-5 | 1.227E-8 | 7.07E-6 |  |
| Type 2 |  |  |  |  |
| Cross Area, A m$^2$ |  | 1.227E-8 | 1.2566E-5 | 7.07E-6 |

TEMPERATURE-COMPENSATING DEVICE WITH TUNABLE MECHANISM FOR OPTICAL FIBER GRATINGS

BACKGROUND OF THE INVENTION

1. Field of the Invention

The present invention generally relates to optical filters, and more particularly to improved accuracy filtering devices including Bragg filters incorporated in optical waveguides, especially in optical fibers.

2. Description of the Related Art

Fiber Bragg gratings (FBGs) are very important elements widely used in the fabrication of various functional devices for dense wavelength-division-multiplexing (hereinafter referred as WDM) networks, for example FBG stabilized laser sources and various FBG-based WDM devices for multiplexer, demultiplexers and add/drop filter. In these applications of FBGs, a problem arising from changes in the surrounding temperature has been observed. Because the spacing of Bragg grating determines the central wavelength of the reflected optical signal transmitted in an optical fiber, the FBGs are carefully designed and accurately manufactured. The problem is that the optical fibers elongate in a raised surrounding temperature so that the reflected wavelength deviates from the design value. These variations which can be as small as 50 GHz (0.4 nm) are undesirable for the narrow channel spacings used in high-performance systems. Thus, reducing the thermal variability of FBGs is a key to commercial success in the telecommunications industry.

FBGs can be fabricated by interferometric or phase-mask techniques. However, packaging is a vital technology, which makes FBGs suitable in real-world applications. Baking, laser welding, epoxing, and re-coating can result in the deviation of desired central wavelength. Thus, a packaging device designed with a post-tuning mechanism is necessary. To compensate the FBGs thermal wavelength shift, a mechanism that has positive and negative thermal effects is desirable. One of the methods to achieve this object is to include a press-stressed mechanism in the packaging device.

There are already known various constructions of optical filters, among them such which utilize the Bragg effect for wavelength selective filtering. U.S. Pat. No. 4,725,110, issued on Feb. 16, 1988, discloses an example of a method for incorporating an optical filter of this type in an optical fiber. This method involves imprinting at least one periodic grating in the core of the optical fiber by exposing the core through the cladding to the interference pattern of two ultraviolet beams that are directed against the optical fiber at two angles relative to the fiber axis that complement each other to 180 degree. This results in a situation where the grating is oriented normal to the fiber axis so that it reflects, of the light launched into the fiber core for guided propagation therein in a propagation direction, only that having a wavelength within a very narrow range, back along the fiber axis opposite to the original propagation direction so that such reflected light is guided in the core to the point at which the original light had been launched into the fiber core. On the other hand, this grating is substantially transparent to light at wavelengths outside the aforementioned narrow band so that it does not affect the further propagation of such other light. The incorporated periodic grating of this kind thus produces a narrow transmission notch and a commensurately narrow reflection peak in the spectrum of the light propagating in the optical fiber in one or the other of its longitudinal directions. The frequency of the light affected in this manner by the incorporated periodic grating is related to the periodicity of the grating in a manner explained in the above patent.

The optical fiber with the incorporated grating filter obtained in the above manner is well suited for use as a strain or temperature sensor because the frequency of the light reflected by the grating varies either with the strain to which the grating region is subjected, or with the temperature of the grating region, in a clearly defined relationship, which is substantially linear at least within the range of interest, to either one of these parameters. It is also possible to employ this kind of a sensor in an environment where both the strain of the grating region due to external forces imposed on the fiber, and the temperature of the grating region, vary with time in a manner that is not necessarily concurrent, and to separately evaluate the reflected wavelength changes attributable to the grating region strain, on the one hand, and the grating region temperature, on the other hand, in a manner that is also discussed in the above patent.

As advantageous as the incorporated optical core grating filter of the above type is for use in the above and similar applications, there are other applications which would greatly benefit from the use of such a filter but for which the above filter is not suited in its basic form disclosed in the above patent, for the very reason that enables it to serve as a temperature sensor, that is, the temperature dependency of the wavelength of the light reflected thereby. Inasmuch as the frequency of the light reflected by such optical filter varies with the temperature of the grating region, this basic filter cannot be used in applications where the reflected light frequency is to be independent of temperature. This precludes the use of the basic filter as a frequency standard and in similar applications.

U.S. Pat. No. 5,042,898, issued to Morey et al. on Aug. 27, 1991, discloses a cylindrical package comprising two materials with different thermal-expansion coefficients. The changes of fiber longitudinal strain can be compensated by a grating embedded component. The disclosed temperature compensated optical waveguide device is based on the concept that changes or shifts in wavelength attributable to changing optical grating strains can be used to counteract and/or eliminate shifts in wavelength resulting from variations in the optical grating temperature. For example, a constant wavelength of reflected light may be maintained during a drop in temperature by increasing the longitudinal strain on the fiber, and vice versa. In the compensation device described in U.S. Pat. No. 5,042,898, a portion of the optical fiber containing the embedded grating is sectioned off by securing the optical fiber at each side of the grating to separate metallic compensating sections arranged for longitudinal movement relative to one another. By mechanically adjusting the compensating members longitudinally relative to each other to thereby vary the distance between them, there is imposed on the optical grating a longitudinal strain of a magnitude that varies in a manner to balance out or compensate for wavelength variations resulting from changes in the temperature of the grating. This prior art temperature compensating waveguide device arrangement is, however, cumbersome and expensive to manufacture. Recently Corning Inc. has used a packaging substrate with negative thermal expansion coefficient in the fiber grating. The long-term reliability is being investigated. However, a more compact package with tunable mechanism and low temperature dependency is needed in the market.

SUMMARY OF THE INVENTION

It is a primary object of the present invention to provide a temperature-compensating device with tunable mechanism for optical fiber gratings, in which very fine fiber grating can be obtained.

It is another object of the present invention to provide a temperature-compensating device with tunable mechanism for optical fiber gratings, which is easy to use and the fiber therein will not be twisted.

It is a further object of the present invention to provide a temperature-compensating device with tunable mechanism for optical fiber gratings, in which the device is very compact.

According to the present invention, the device mainly includes a moving pin, a tube housing, a rotation sleeve, a plug and a locking screw. The moving pin has a first predetermined outer screw pitch, for example 0.35 mm pitch, at one end and an elongated slot at the other end for receiving the locking screw. The tube housing has a second predetermined outer screw pitch, for example 0.4 mm pitch, at one end and an inner screw pitch at the other end. A flange is formed on the outer surface of the tube housing near the end having the second predetermined outer screw pitch and a hole is formed therethrough for receiving the locking screw. The rotation sleeve has a first predetermined inner thread corresponding to the first predetermined outer screw pitch of the moving pin, and a second predetermined inner thread corresponding to the second predetermined outer screw pitch of the tube housing. The plug is inserted into the end of the tube housing with outer thread engaged with the inner screw pitch of the tube housing.

The grating fiber is placed inside the moving pin. The slot of the moving pin is guided by the locking screw which enables the linear movement of the moving pin. When the locking screw is in position, the moving pin cannot self-rotate, so rotating the sleeve in one cycle will make the moving pin has a movement of the second predetermined outer screw pitch minus the first predetermined outer screw pitch, 0.4 mm −0.35 mm=0.05 mm. Once the locking screw is rotated outwardly not to guide the slot, rotating the rotation sleeve in 360 degrees will result in the second predetermined outer screw pitch (0.4 mm) movement of the moving pin, which called "quick movement".

According to the present invention, a more compact package with a very fine tunable mechanism and low temperature dependency is provided to overcome the disadvantages of the conventional devices.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
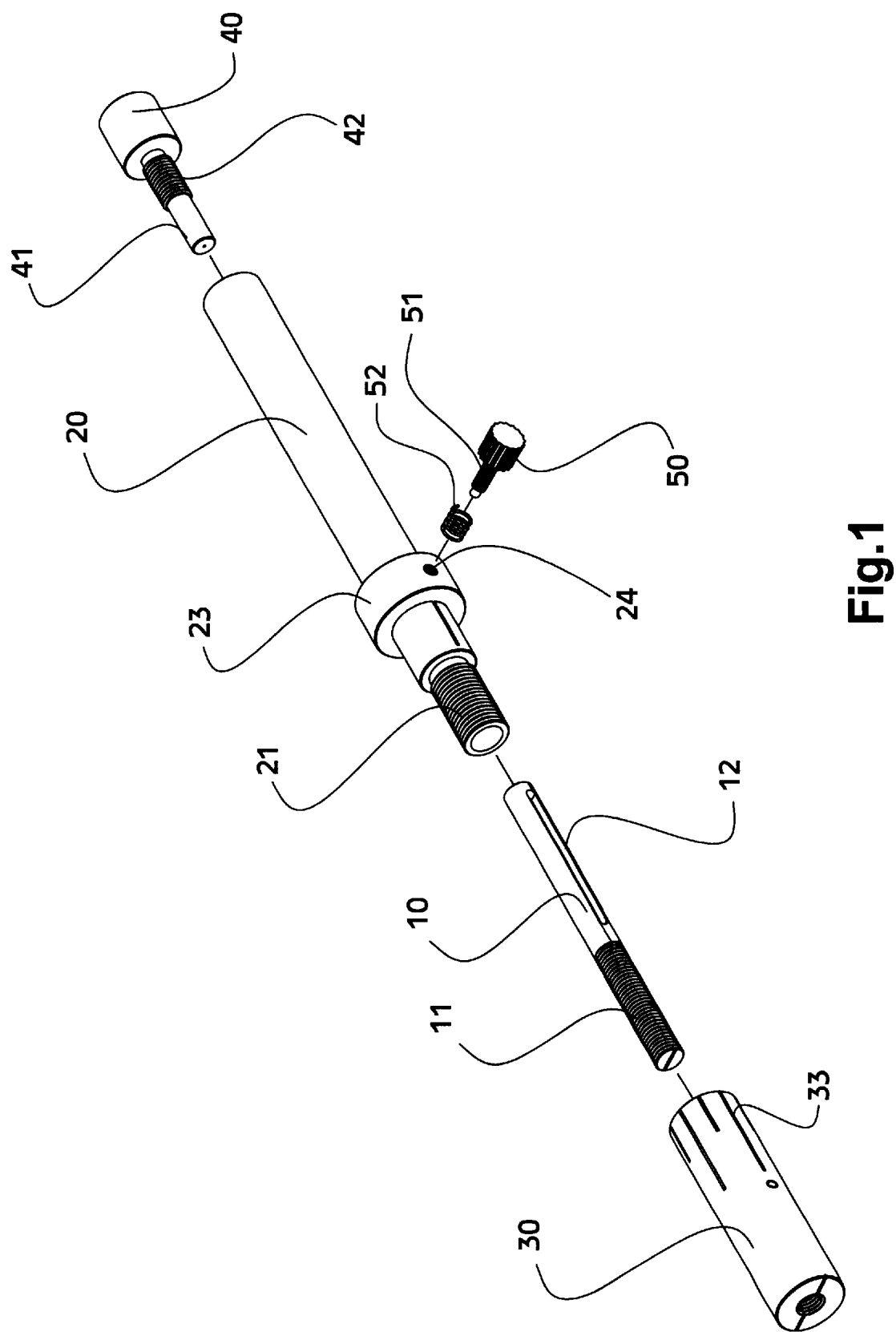
FIG. 1 is an exploded view of the temperature-compensating device with tunable mechanism for optical fiber gratings in accordance with a first embodiment of the present invention.
Figure 2:
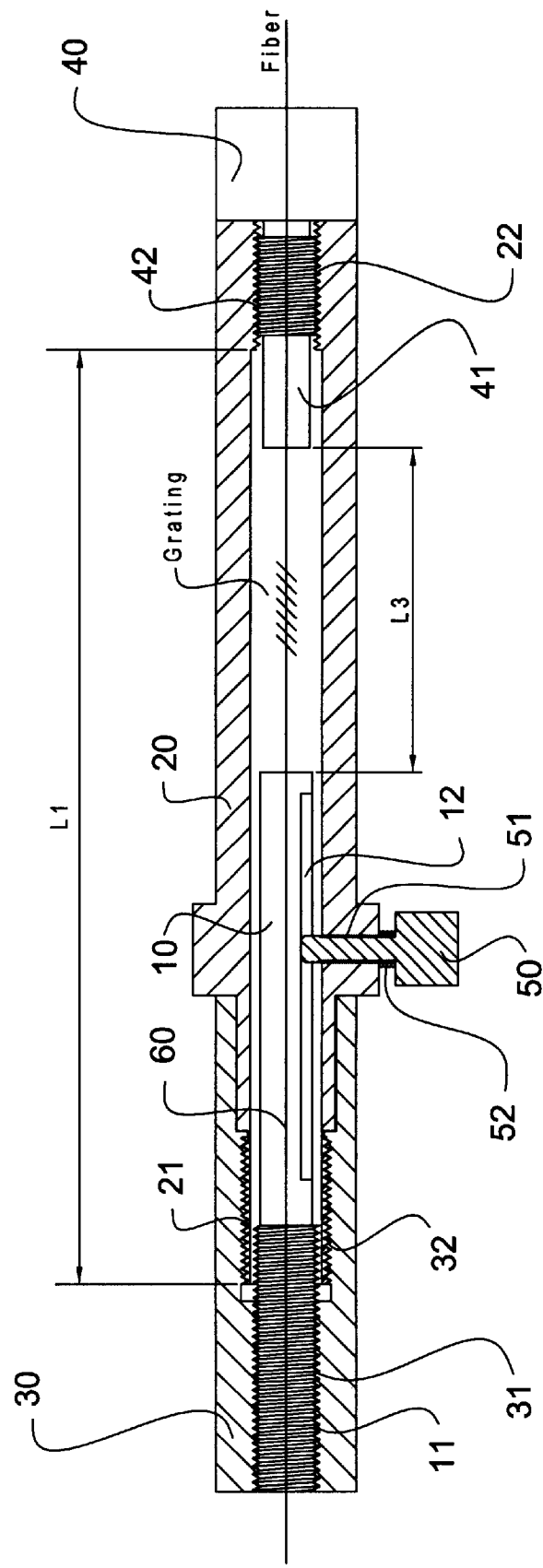
FIG. 2 is a longitudinal cross sectional view of the first embodiment of the present invention.

FIG. 1 illustrates an exploded view of the temperature-compensating device with tunable mechanism for optical fiber gratings in accordance with the first embodiment of the present invention and FIG. 2 illustrates a longitudinal cross sectional view thereof. The device mainly includes a moving pin 10, a tube housing 20, a rotation sleeve 30, a plug 40 and a locking screw 50. The moving pin 10 has a first predetermined outer screw pitch 11, for example 0.35 mm pitch, at one end and an elongated slot 12 at the other end for receiving the locking screw 50. The tube housing 20 has a second predetermined outer screw pitch 21, for example 0.4 mm pitch, at one end and an inner screw pitch 22 at the other end. A flange 23 is formed on the outer surface of the tube housing 20 near the end having the second predetermined outer screw pitch 21, and a hole 24 is formed therethrough for receiving the locking screw 50. Preferably, a spring 52 is disposed between the locking screw 50 and the hole 24 of the tube housing 20. The rotation sleeve 30 has a first predetermined inner thread 31 corresponding to the first predetermined outer screw pitch 11 of the moving pin 10 and a second predetermined inner thread 32 corresponding to the second predetermined outer screw pitch 21 of the tube housing 20. A plurality of marks 33 are provided on the rotation sleeve 30 for indicating the rotation angles of the sleeve 30. The plug 40 has an extending end 41 with outer thread 42 thereon corresponding to the inner screw pitch 22 of the tube housing 20. The plug 40 is inserted into the end of the tube it housing 10 with outer thread 42 engaged with the inner screw pitch 22 of the tube housing 20.

As shown in FIG. 2, the grating fiber 60 is first placed inside the moving pin 10 and then the fiber 60 is metallized or soldered to the moving pin 10 and the plug 40. The slot 12 of the moving pin 10 is guided by the extending end 51 of the locking screw 50 which enables the linear movement of the moving pin 10. The moving pin 10 is disposed between the rotation sleeve 30 and tube housing 20 with one end inserted into the tube housing 20 and the other end is screwed into the first predetermined inner thread 31, and then the second predetermined inner thread 32 of the rotation sleeve 30 is screwed onto the second predetermined outer screw pitch 21 of the tube housing 20. When the locking screw 50 is in position, the moving pin 10 cannot self-rotate, so rotating the sleeve 30 in one cycle will make the moving pin 10 has a movement of the second predetermined outer screw pitch 21 minus the first predetermined outer screw pitch 11, that is, 0.4 mm−0.35 mm=0.05 mm. Once the locking screw 50 is rotated outwardly not to guide the slot 12, rotating the rotation sleeve 30 in 360 degrees will result in the second predetermined outer screw pitch 11 (0.4 mm) movement of the moving pin 10, which called "quick movement". The rotation sleeve 30 and tube housing 20 are made with the same material (e.g., stainless, Kovar) with a first thermal expansion coefficient, while moving pin 10 and plug 40 are fabricated in other material (e.g., aluminum) with a second thermal expansion coefficient greater than the first thermal expansion coefficient.

Figure 3:
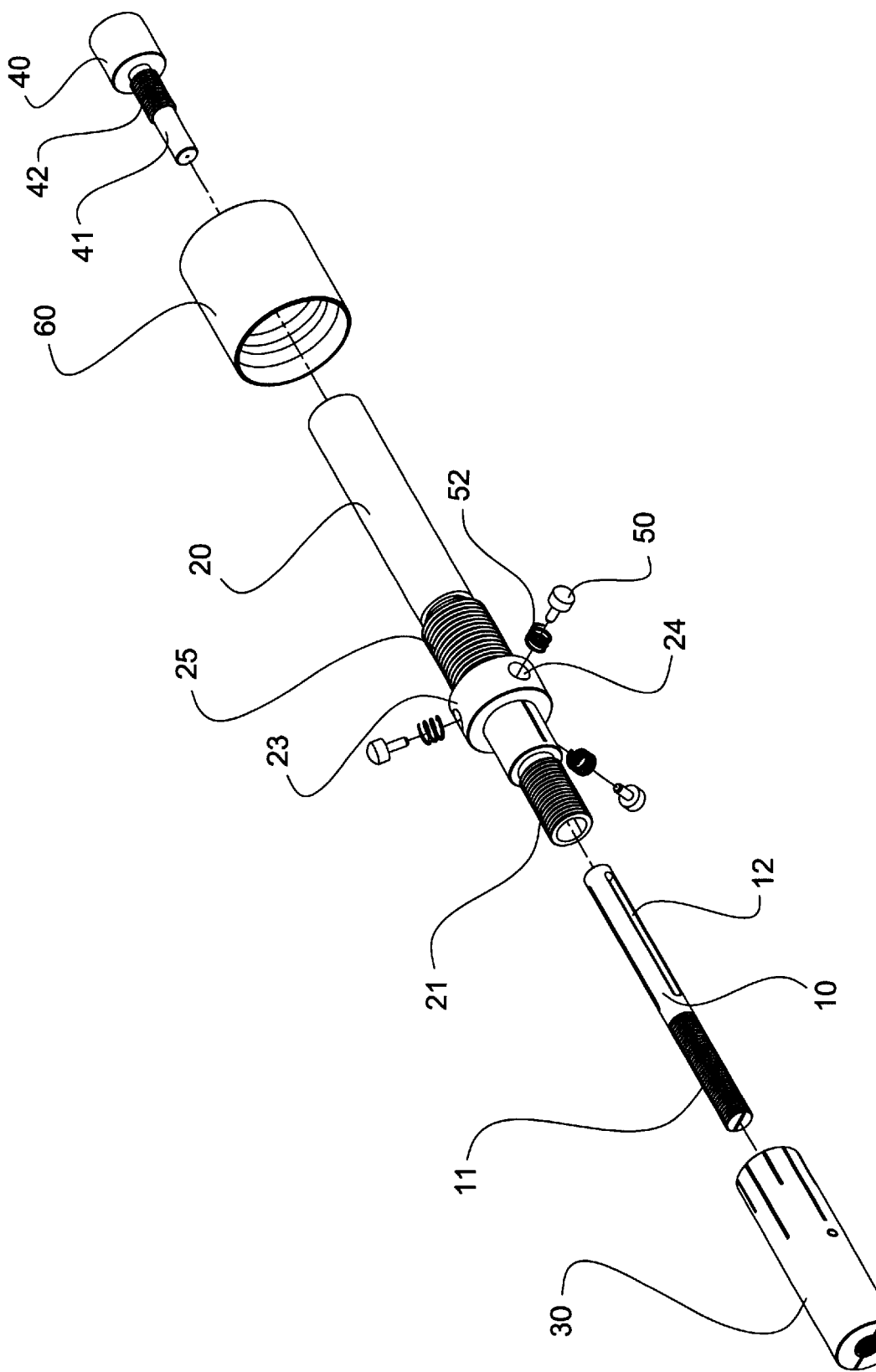
FIG. 3 is an exploded view of the temperature-compensating device with tunable mechanism for optical fiber gratings in accordance with a second embodiment of the present invention.
Figure 4:
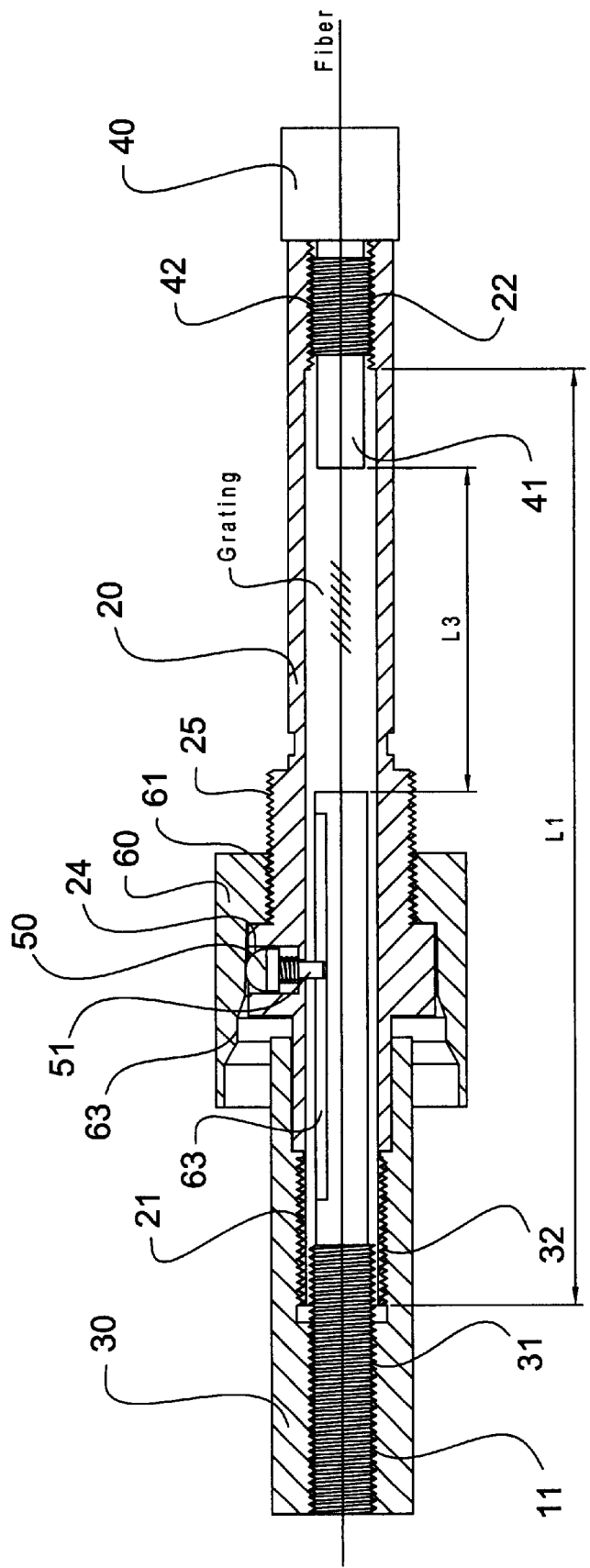
FIG. 4 is a longitudinal cross sectional view of the second embodiment of the present invention.

FIG. 3 illustrates an exploded view of the temperature-compensating device with tunable mechanism for optical fiber gratings in accordance with the second embodiment of the present invention and FIG. 4 illustrates a longitudinal cross sectional view thereof. The device of the second embodiment mainly includes a moving pin 10, a tube housing 20, a rotation sleeve 30, a plug 40, at least one locking pin 50 and a pin sleeve 60. The moving pin 10 has a first predetermined outer screw pitch 11, for example 0.35 mm pitch, at one end and elongated slots 12 at the other end for receiving the locking pins 50. The tube housing 20 has a second predetermined outer screw pitch 21, for example 0.4 mm pitch, at one end and an inner screw pitch 22 at the other end. A flange 23 is formed on the outer surface of the tube housing 20 near the end having the second predetermined outer screw pitch 21, and three holes 24 are formed therethrough for receiving the locking pins 50. An outer thread 25 is provided on the outer surface of the tube housing 20 adjacent the flange 23. A spring 52 is disposed between the locking pin 50 and the hole 24 of the tube housing 20. The pin sleeve 60 has an inner thread 61 corresponding to the outer thread 25 of the tube housing 20. The pin sleeve 60 is provided with a first inner wall 62 with a first diameter and a second inner wall 63 with a second diameter greater than the first diameter. The rotation sleeve 30 has a first predetermined inner thread 31 corresponding to the first predetermined outer screw pitch 11 of the moving pin 10, and a second predetermined inner thread 32 corresponding to the second predetermined outer screw pitch 21 of the tube housing 20. A plurality of marks 33 are provided on the rotation sleeve 30 for indicating the rotation angles of the sleeve 30. The plug 40 has an extending end 41 with outer thread 42 thereon corresponding to the inner screw pitch 22 of the tube housing 20. The plug 40 is inserted into the end of the tube housing 10 with outer thread 42 engaged with the inner screw pitch 22 of the tube housing 20.

As shown in FIG. 4, the grating fiber 60 is first placed inside the moving pin 10. The moving pin 10 is disposed between the rotation sleeve 30 and tube housing 20 with one end inserted into the tube housing 20 and the other end is screwed into the first predetermined inner thread 31, and then the second predetermined inner thread 32 of the rotation sleeve 30 is screwed onto the second predetermined outer screw pitch 21 of the tube housing 20. When the pin sleeve 60 is in a position with its first inner wall pressing the locking pin 50, the slot 12 of the moving pin 10 is guided by the extending end 51 of the locking pin 50 which enables the linear movement of the moving pin 10. When the locking pin 50 is engaged with the slot 12, the moving pin 10 cannot self-rotate, so rotating the sleeve 30 in one cycle will make the moving pin 10 has a movement of the second predetermined outer screw pitch 21 minus the first predetermined outer screw pitch 11, (0.4 mm−0.35 mm=0.05 mm. When the pin sleeve 60 is in a position with its second inner wall 63 pressing the locking pin 50, the slot 12 of the moving pin 10 is not guided by the extending end 51 of the locking pin 50 Accordingly, rotating the rotation sleeve 30 in 360 degrees will result in the second predetermined outer screw pitch 21 (0.4 mm) movement of the moving pin 20, which called "quick movement". The fiber 60 can be metallized or soldered to the moving pin 10 and the plug 40. Like the first embodiment, the rotation sleeve 30 and tube housing 20 are made with the same material (e.g., stainless, Kovar) with a first thermal expansion coefficient, while moving pin 10 and plug 40 are fabricated in other material (e.g., aluminum) with a second thermal expansion coefficient greater than the first thermal expansion coefficient.

It should be appreciated that the above two embodiments of the present invention provide the temperature-compensating devices with a tunable mechanism for optical fiber gratings, wherein the grating can be tuned with a very fine adjustment when the locking means engages with the slot of the moving pin or the grating can be tuned with a relatively quick adjustment when the locking means does not engage with the slot of the moving pin. In additions, a more compact package with a tunable mechanism and low temperature dependency is provided to overcome the disadvantages of the conventional devices.

The followings will detailedly explain the temperature compensation for the devices of the present invention.

Temperature Compensation Method and Techniques

The material expansion constants and lengths required to eliminate the temperature effect can be calculated as follows:

The free space Bragg wavelength is given by:

$$\lambda = 2n\Lambda \qquad (1)$$

where n is the refractive index of the fiber core and $\Lambda$ is the spacing of the Bragg grating. The change in Bragg wavelength for a temperature change $\Delta T$ from ambient is given by [1]

$$\frac{\Delta\lambda}{\lambda} = \Delta\lambda_T + \Delta\lambda_P \qquad (2)$$

where $\Delta\lambda_T$ is the temperature contribution and $\Delta\lambda_P$ represents thermal induced elastic structure deformation acting on grating fiber. For a zero wavelength shift or a very low temperature dependency, we must have the condition $$\Delta\lambda_T + \Delta\lambda_P = 0 \qquad (3)$$

Method 1: Deformation substitutions

In this method, strains resulted from deformed structure are directly used as strains of grating fiber. The stiffness of grating fiber and that of device components will not take into account. According to U.S. Pat. No. 5,042,898, Morey et al. used the expression where $\Delta\lambda_T$ and $\Delta\lambda_P$ are linear function of $\Delta T$ and $\Delta\epsilon$ respectively.

$$\Delta\lambda_T = \frac{d\Lambda}{\Lambda dT} + \frac{dn}{ndT} = (\alpha_f + \xi)\Delta T \qquad (4)$$

$$\Delta\lambda_P = (1 - P_e)\Delta\varepsilon$$

$\alpha_f$ is the thermal expansion coefficient of grating fiber. It is a constant but depends on whether it is uniform grating or chirp grating and on the designed central wavelength; $\epsilon$ is the thermal coefficient of refractive index of the fiber core, and $P_e$ the photoelastic constant (~0.22 for silica fiber). $\Delta\epsilon$ is the strain change in the grating fiber with $\Delta T$. Referring to FIG. 2, $\Delta\epsilon$ can be related to the components' lengths of the structure and can be expressed as $$\Delta\varepsilon = \frac{(\alpha_1 L_1 - \alpha_2(L_1 - L_3) - \alpha_f L_3)\Delta T}{L_3} \qquad (5)$$

where $\alpha_1 L_1$, $\alpha_2(L_1-L_3)$, and $\alpha_f L_3$ correspond to the length changes of the tube housing 20, fiber embedded screws and grating fiber 60 respectively, $\alpha_1$, $\alpha_2$ and $\alpha_f$ are the thermal expansion coefficients of tube housing 20, moving pin 10 and grating fiber 60 respectively. With given material constants: $\alpha_f, \epsilon$, $P_e$, $L_3/L_1$ can be obtained from Eqs. (4), (5) and Eq. (3) and is expressed as, $$\frac{L_3}{L_1} = \frac{(1-P_e)(\alpha_2 - \alpha_1)}{(\alpha_f + \xi) + (1-P_e)(\alpha_2 - \alpha_f)} \quad (6)$$

A. Method 2: Static equilibrium

From static equilibrium, the force in the device tube must balance the force in the grating fiber 60. The resonant wavelength depends also on the thermally induced resultant force, F. We further decompose that the change of Bragg wavelength is linear function of $\Delta T$ and $\Delta F$.

$$\Delta \lambda_T = \alpha_{eff} \Delta T$$

$$\Delta \lambda_F = \alpha_F \Delta F \quad (7)$$

where $\alpha_{eff}$ is the effective coefficient, for example $\alpha_{eff} = 7.1 \times 10^{-6}/°$ C. Similar to $P_e$, $\Delta F$ is the resultant force acted on the grating fiber due to thermally induced structure deformation. $\alpha_F$ is called force constant and serves as the relation between change of resonant wavelength and external force. $\Delta F$ is related to $\Delta T$ by [4]

$$\Delta F = \frac{(\alpha_1 L_1 - \alpha_2(L_1 - L_3) - \alpha_f L_3)\Delta T}{\left[\frac{L_3}{A_f E_f} + \frac{(L_1 - L_3)}{A_2 E_2} + \frac{L_1}{A_1 E_1}\right]} \quad (8)$$

In this case, $\alpha_{eff}$ and $\alpha_F$ are obtained experimentally. With given material properties, $L_3/L_1$, can be obtained from Eqs. (3), (7), (8) and is expressed as, $$\frac{L_3}{L_1} = \frac{\alpha_2 - \alpha_1 - \frac{\alpha_{eff}}{\alpha_F A_2 E_2} - \frac{\alpha_{eff}}{\alpha_F A_1 E_1}}{\frac{\alpha_{eff}}{\alpha_F A_f E_f} - \frac{\alpha_{eff}}{\alpha_F A_2 E_2} + \alpha_2 - \alpha_f} \quad (9)$$

Method 1 uses strains as a driving force in the compensation equation while method 2 includes the stiffness of the structure and uses resultant force in the equilibrium equation. The results obtained from these two methods are discussed belows Experiments and discussions The uniform fiber gratings (Ge-doped fiber from Fiber core, USA) approximately 21 mm long written with phase a mask and an excimer laser (operating at 248 nm). The designed. central wavelength was 1542 nm with a 530 nm Bragg spacing on the mask. Re-coating was applied in the process to insure the stability of central wavelength. The finished grating fiber is then placed in temperature controlled chamber. With spectrum analyzer (ANDO,AQ-6315A) and light source (EXFO, FLS2100), the temperature dependence of reflection spectrum can be measured.

Figure 5:
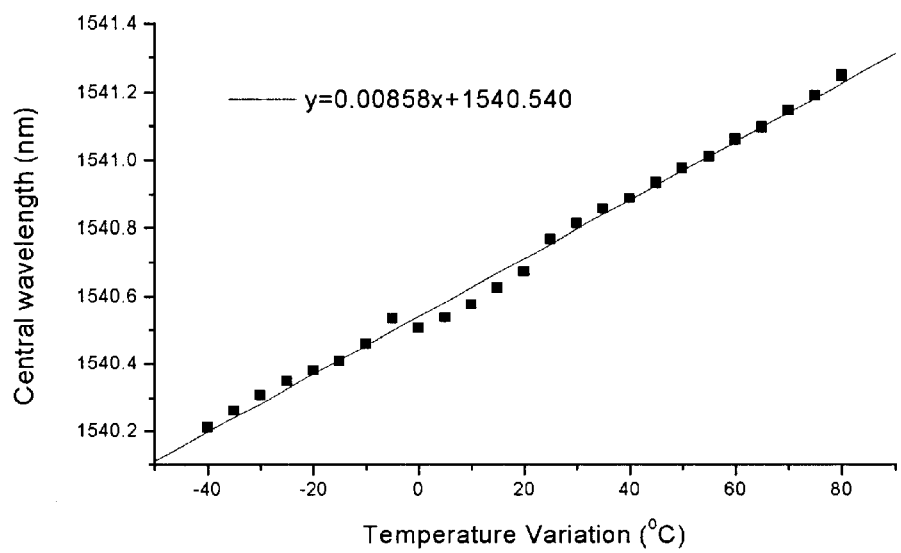
FIG. 5 is a schematic diagram showing variation of Bragg wavelength with temperature for a free, uncompensated grating.

Variation of Bragg wavelength with temperature for a free fiber grating is shown in FIG. 5. The slope is found to be $\alpha_{eff}=0.0086$ nm/° C.(or $5.584\times10^{-6}$ /° C. at 1540 nm). Similar results can be found in Yoffe's work ($7.5\times10^{-6}/°$ C. at 1520 nm) and Fang's work ($7.83\times10^{-6}/°$ C. at 1553 nm).

Figure 6:
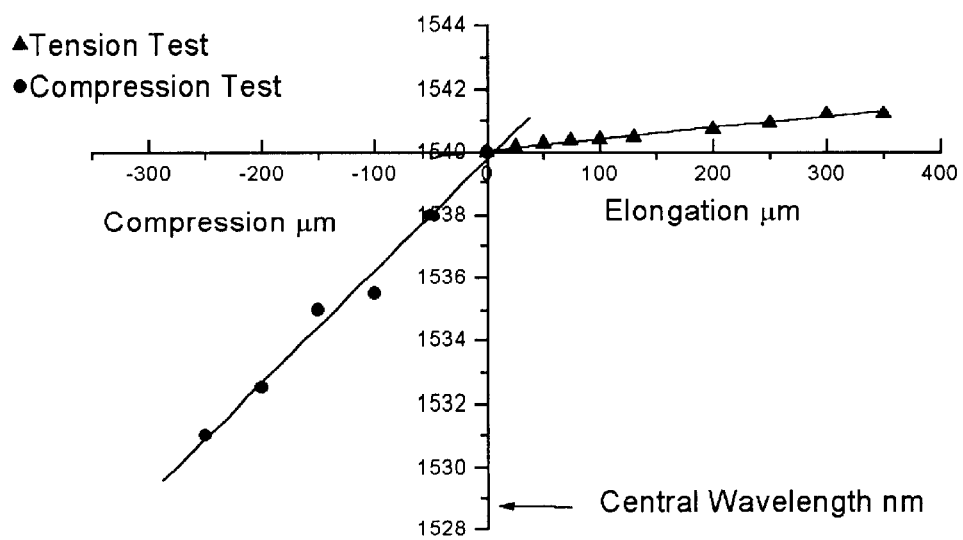
FIG. 6 is a schematic diagram showing the strain dependence of $\lambda$ at room temperature.

The strain dependence of $\lambda$ at room temperature is shown in FIG. 6. The change of fiber elongation can be measured directly from the compensated fixture with 5 0.05 mm/ptich movement. The wavelength shifts are monitored under fiber tension and compression conditions. A nonlinearly is exhibited if elongation is over 350 $\mu$m as reported in Fang's work. The change of 200 $\mu$m elongation prodiced 1.0 nm wavelength-shift. Thus, the tune-up mechanism provided in the present invention functions as 0.0625 nm/90° wavelength shift. It also shows in this figure that 0.38% of tensile strain change produced 0.3 nm wavelength shift. The photoelastic constant is thus computed as $(1-P_e)=0.7875$, which is very close to the known value of 0.78.

The slope in compressive strain-wavelength change is much stiffer in comparing to that in the tension as we see in FIG. 6. The best way to overcome the dissimilar photoelastic constant in both regions is to apply a pre-tension or pre-compression stress on the grating fiber so the fiber will always experience a tension/compression stresses during the ambient temperature change (−40° C. to 80° C.). The amount of pre-stress (or wavelength shift) required to make the grating fiber in tension condition is computed as $\alpha_{eff} \times$ (−40° C.−25° C.) while $\alpha_{eff} \times (80°$ C. −25° C.) is needed for pre-compression condition. These pre-shift conditions can be achieved by the tune-up mechanism (i.e., approximately 0.025 mm movement in pre-compression or 0.12 mm movement in pre-tension if fiber length is 21 mm). The pre-compression condition can result in the fiber bulking and thus, is eliminated in the present experiment.

Figure 7:
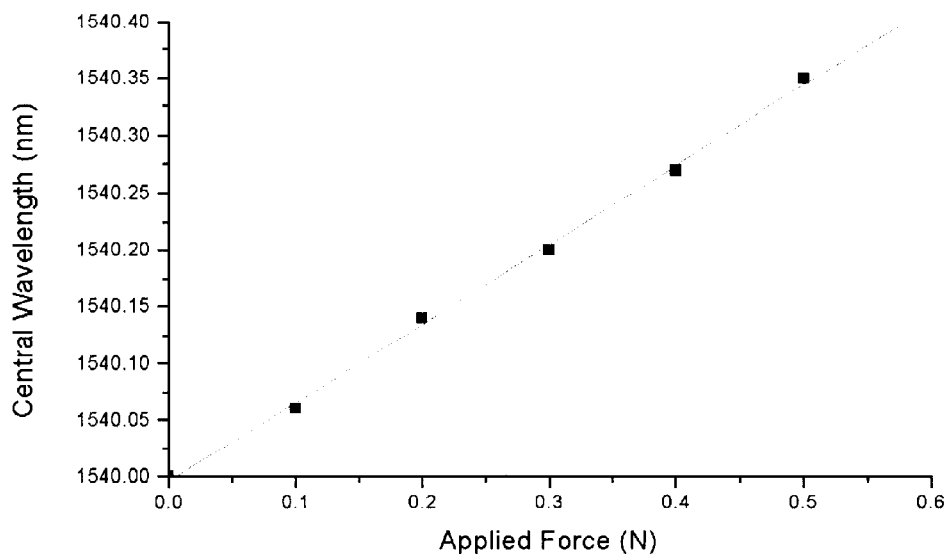
FIG. 7 is a schematic diagram showing the relation of applied force and wavelength shift.

To use method 2, the force equilibrium method, $\alpha_F$ must be acquired through a simple tensile testing with measurement of applied force. FIG. 7 shows the relation of applied force and wavelength shift. The computed slope is known as force constant and is 0.7 nm/N (or $4.545\times10^{-4}$/N) in our experiment. With the aids of FIG. 6 and FIG. 7, we are able to compute the elastic modulus of grating fiber as $0.92\times 10^{10}$N /m$^2$.

Figure 8:
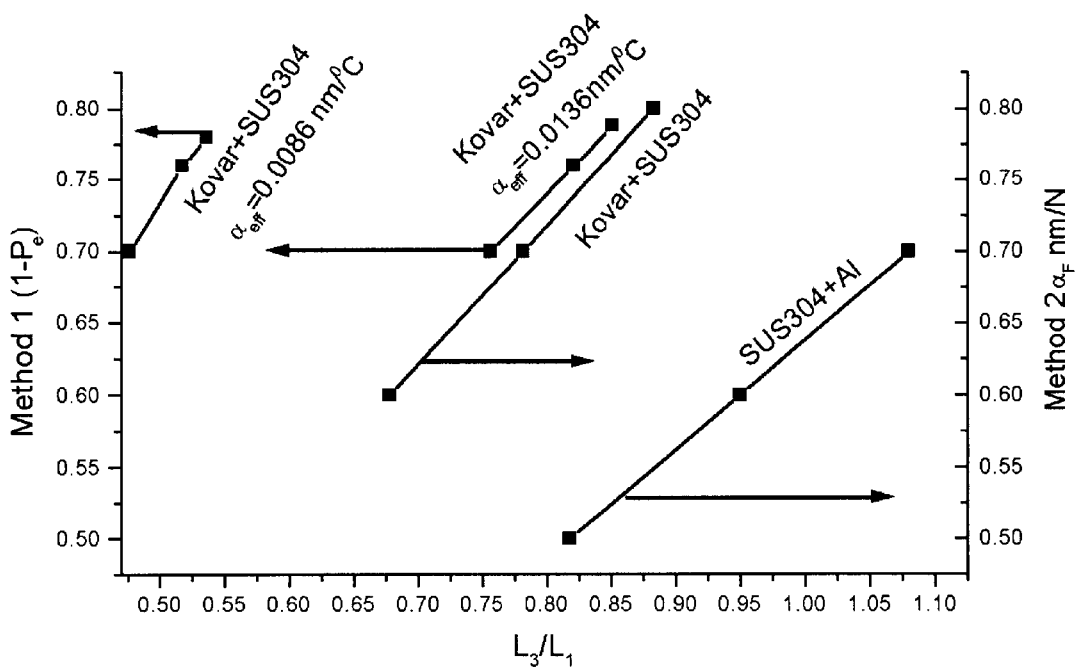
FIG. 8 is a schematic diagram showing the $L_3/L_1$ ratio obtained from two methods.
Figures 9, 10:
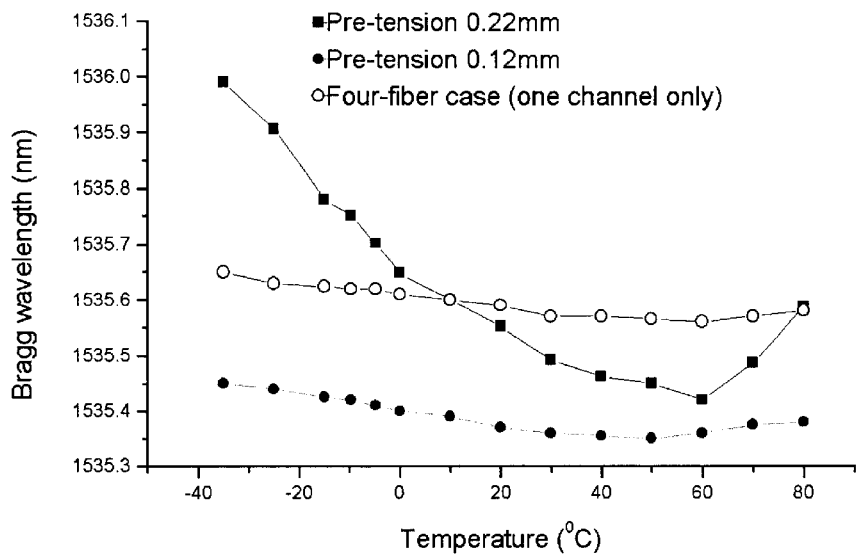
FIG. 9 is a schematic diagram showing the compensated results for $L_1$=50 mm, $L_3/L_1$=0.75 with pre-stress 0.12 mm elongation.
FIG. 10 is a table of the material properties.

For a given $\alpha_{eff}$, $\alpha_F$, $(1-P_e)$ and the material properties listed in the Table of FIG. 10, the ratio $L_3/L_1$ can be computed by both methods, as we shown in FIG. 8. In method 2, we applied two combinations: one is Kovar for the tube housing 20 and SUS304 for the moving pin 10 and plug 40, the other is SUS304 for rotation sleeve 30 and aluminum for tube housing 20 and plug 40 in our data presentation. For the Kovar and SUS304 combination, the corresponding $L_3/L_1$ value is 0.77 as shown in FIG. 8. The second combination yields larger $L_3/L_1$ value since the thermal expansion coefficients between two packaging materials are close. For the case of four-fiber packaging using method 2, a similar ratio is obtained, thus, we eliminated in the data presentation. The results obtained from Method 1 are also shown in FIG. 8. The computed $L_3/L_1$ values are much lower than those obtained in Method 2 if $\alpha_{eff}=0.0086$ nm/° C. is used in both methods. However, if we applied the known parameters (i.e., $\alpha_f=5.5\times10^{-7}/°$ C. and $\xi=8.31\times10^{-6}/°$ C.) in Eqn (6), the computed $L_3/L_1$ values will be much closer to the results obtained from method 2. For (1−Pe) is equal to 0.78, the $L_3/L_1$ is about 0.85, which is close to the value of 0.77 obtained from method 2. Thus, for given parameters, method 1 can be used as the first approximation in determining the $L_3/L_1$ ratio.

FIG. 9 shows the compensated results for $L_1=50$ mm, $L_3/L_1=0.75$ with pre-stress 0.12 mm elongation. We used a Kovar tube with inner and outer diameters of 3 and 5 mm, respectively. The wavelength change can be controlled within 0.1 nm during the temperature change of −40° C. to 80° C. (i.e., temperature coefficient of $8.3\times10^{-4}$ nm/° C.). Four-fiber packaging can also be achieved within a range of 0.1 nm by our tune-up mechanism. If the grating fiber is over-stretched, the force constant will be changed accordingly due to non-linearity at large strain and thus a larger wavelength variation can be seen in FIG. 9.

We have demonstrated a compensated device which is relatively simple to construct, inexpensive to manufacture, easy to use and yet reliable in operation. A special design tune-up mechanism included in this device can alternate the central wavelength as small as 0.0625 nm/90° rotation. A pre-stressed grating mounted in a tube 50 mm long and 5 mm in diameter exhibited a total variation in Bragg wavelength of 0.1 nm over −40° C. to 80° C. temperature range. The experimental scheme and theorem are also provided as the implementation of this compensated device. The force equilibrium method seems to provide better prediction in determining the grating length. A multi-grating fiber used in the other applications can also be incorporated in this device as we have experimentally verified.

According the forgoing descriptions, the temperature-compensating device with tunable mechanism for optical fiber gratings in accordance with the present invention is has the following advantageous features:

(1) A nanometer-level (0.0625 nm wavelength shift/90 degree) adjustment can be used to tune-up the central wavelength after the packaging is completed. This differential pitch movement can also serve as pre-stress mechanism while a fiber is fixed in this device.

(2) A tubular compensated element with linear motion can be used for multi-FBG applications. It cannot be achieved by using two opposite screws with different pitches. Because two screws have to make opposite rotation in order to get a differential pitch movement, it can twist the existing fiber(s) in either pre or post packaging.

(3) A locking mechanism is provided. No additional tools are required during pre and post tune-up stages. One can fix the package simply by tie up the guiding screw.

(4) A mark is provided on the rotation sleeve so the degree of linearly motion can be controlled precisely. Thus a desired central wavelength can be achieved easily without the help of optical spectrum analyzer.

Although the invention has been explained in relation to its preferred embodiment, it is to be understood that many other possible modifications and variations can be made without departing from the spirit and scope of the invention as hereinafter claimed.

What is claimed is:

1. A temperature-compensating device with tunable mechanism for optical fiber gratings comprising:

a moving pin having a first predetermined outer screw pitch at one end and an elongated slot at the other end, a tube housing having a second predetermined outer screw pitch at one end and an inner screw pitch at the other end;

a rotation sleeve having a first predetermined inner thread corresponding to the first predetermined outer screw pitch of the moving pin, and a second predetermined inner thread corresponding to the second predetermined outer screw pitch of the tube housing; and a locking means disposed at the tube housing for selectable engagement with the slot of the moving pin;

wherein the moving pin is disposed between the rotation sleeve and tube housing with one end inserted into the tube housing and the other end is screwed into the first predetermined inner thread, and then the second predetermined inner thread of the rotation sleeve is screwed onto the second predetermined outer screw pitch of the tube housing, whereby when the locking means is in a position of engagement with the slot of the moving pin, the moving pin cannot self-rotate, so rotating the sleeve in one cycle will make the moving pin have a movement of the second predetermined outer screw pitch minus the first predetermined outer screw pitch, and when the locking means is in a position not of engagement with the slot, rotating the rotation sleeve 360 degrees will result in the second predetermined outer screw pitch movement of the moving pin.

2. The temperature-compensating device with tunable mechanism for optical fiber gratings as claimed in claim 1, further comprising a plug disposed at the other end of the tube housing opposite to the rotation sleeve.

3. The temperature-compensating device with tunable mechanism for optical fiber gratings as claimed in claim 2, wherein the rotation sleeve and tube housing are made with a first material with a first thermal expansion coefficient and the moving pin and plug are made with a second material with a second thermal expansion coefficient greater than the first thermal expansion coefficient.

4. The temperature-compensating device with tunable mechanism for optical fiber gratings as claimed in claim 1, wherein the rotation sleeve is provided with marks for indicating the rotation angles of the sleeve.

5. A temperature-compensating device with tunable mechanism for optical fiber gratings comprising:

a moving pin having a first predetermined outer screw pitch at one end and an elongated slot at the other end, a tube housing having a second predetermined outer screw pitch at one end and an inner screw pitch at the other end;

a rotation sleeve having a first predetermined inner thread corresponding to the first predetermined outer screw pitch of the moving pin, and a second predetermined inner thread corresponding to the second predetermined outer screw pitch of the tube housing;

a locking means disposed at the tube housing for selectable engagement with the slot of the moving pin; and a locking means sleeve having a first inner wall with a first diameter and a second inner wall with a second diameter greater than the first diameter wherein the moving pin is disposed between the rotation sleeve and tube housing with one end inserted into the tube housing and the other end is screwed into the first predetermined inner thread, and then the second predetermined inner thread of the rotation sleeve is screwed onto the second predetermined outer screw pitch of the tube housing, whereby when the locking means sleeve is in a position with its first inner wall pressing the locking means, the moving pin cannot self-rotate, so rotating the sleeve in one cycle will make the moving pin have a movement of the second predetermined outer screw pitch minus the first predetermined outer screw pitch, and when the locking means sleeve is in a position with its second inner wall pressing the locking means, rotating the rotation sleeve 360 degrees will result in the second predetermined outer screw pitch movement of the moving pin.

6. The temperature-compensating device with tunable mechanism for optical fiber gratings as claimed in claim 5, further comprising a plug disposed at the other end of the tube housing opposite to the rotation sleeve.

7. The temperature-compensating device with tunable mechanism for optical fiber gratings as claimed in claim 6, wherein the rotation sleeve and tube housing are made with a first material with a first thermal expansion coefficient and the moving pin and plug are made with a second material with a second thermal expansion coefficient greater than the first thermal expansion coefficient.

8. The temperature-compensating device with tunable mechanism for optical fiber gratings as claimed in claim 5, wherein the rotation sleeve is provided with marks for indicating the rotation angles of the sleeve.

* * * * *